United States Patent [19]
Katoh et al.

[11] Patent Number: 5,314,631
[45] Date of Patent: May 24, 1994

[54] STATIONARY BAR CODE READER WHICH CAN BE DETECTED AND SEPARATED INTO A HAND-HELD BAR CODE READER

[75] Inventors: Hiroaki Katoh, Sagamihara; Yoshitaka Murakawa, Fuchu; Toshimasa Miyazaki, Yamato; Nobuyuki Kitamura; Shinichi Sato, Kawasaki, all of Japan

[73] Assignee: Fujitsu Limited, Kawasaki, Japan

[21] Appl. No.: 68,611

[22] Filed: May 27, 1993

Related U.S. Application Data

[63] Continuation of Ser. No. 957,062, Oct. 6, 1992, abandoned, which is a continuation of Ser. No. 603,321, Oct. 25, 1991, abandoned.

[30] Foreign Application Priority Data

Oct. 25, 1989 [JP] Japan .................................. 1-277589

[51] Int. Cl.⁵ .............................................. G06K 7/10
[52] U.S. Cl. ............................................ 235/467; 235/472
[58] Field of Search ............... 235/454, 470, 462, 472, 235/383, 467, 474

[56] References Cited

U.S. PATENT DOCUMENTS

| 4,694,182 | 9/1987 | Howard | 235/472 |
| 4,713,532 | 12/1987 | Knowles | 235/467 |
| 4,766,297 | 8/1988 | McMillan | 235/462 |
| 4,914,280 | 4/1990 | Peterson | 235/474 |
| 5,214,270 | 5/1993 | Rando | 235/472 |

FOREIGN PATENT DOCUMENTS

| 60-102609 | 6/1985 | Japan . |
| 63-192175 | 8/1988 | Japan . |
| 1-269197 | 10/1989 | Japan . |

Primary Examiner—Robert A. Weinhardt
Attorney, Agent, or Firm—Staas & Halsey

[57] ABSTRACT

Units having a beam-scanning function, and a light-receiving function and a photoelectric-conversion function are separated from the main-body of a stationary-type bar code reader as a separable unit. The separable unit is detachably mounted on the main-body unit. The separable unit is mounted on the main-body unit for use as a stationary-type reader when a product on which a bar code is printed is relatively small and light. When a product is large or heavy, the separable unit is separated from the main-body unit for use as a hand-held reader. This improves the operability of the bar code reader and eliminates the need to equip a stationary bar code reader and a hand-held bar code reader separately.

11 Claims, 6 Drawing Sheets

STATIONARY BAR CODE READER WHICH CAN BE DETECTED AND SEPARATED INTO A HAND-HELD BAR CODE READER

This application is a continuation of application Ser. No. 07/957,062, filed Oct. 6, 1992, now abandoned, which is a continuation of Ser. No. 07/603,321, filed Oct. 25, 1991, now abandoned, and entitled Separate Tape Bar Code Reader.

BACKGROUND OF THE INVENTION

The present invention relates to a bar code reader for reading bar codes printed on packages or labels of goods, and more particularly to a separate-type bar code reader comprising a main body and a sub-body detachably mounted on the main body for use as a stationary bar code reader or a hand-held bar code reader.

In recent years, point-of-sale (POS) systems have been in increasing use in department stores and supermarkets so that efficiency in entering information about sales management and products has been improving.

A POS system comprises a bar code reader for reading bar codes attached to products by scanning them with a laser light beam for conversion to a form of information suitable for computational processing, a computer for processing the resulting information, and an electronic cash register coupled between the reader and the computer for outputting information for the customer.

Bar-code readers include the stationary type which requires the goods to be moved relative to the reader, the hand-held type. The hand-held type includes the touch type, the pen type, the gun type, etc., which can be moved relative to the goods. The stationary bar code reader or the hand-held bar code reader is used according to the size and weight of the goods.

In shops that deal in a wide variety of goods, however, it is uneconomical to equip both types. Therefore, a device which can be used as a stationary type or a hand-held type is desired.

Conventional bar code readers are described below.

Figure 1A:
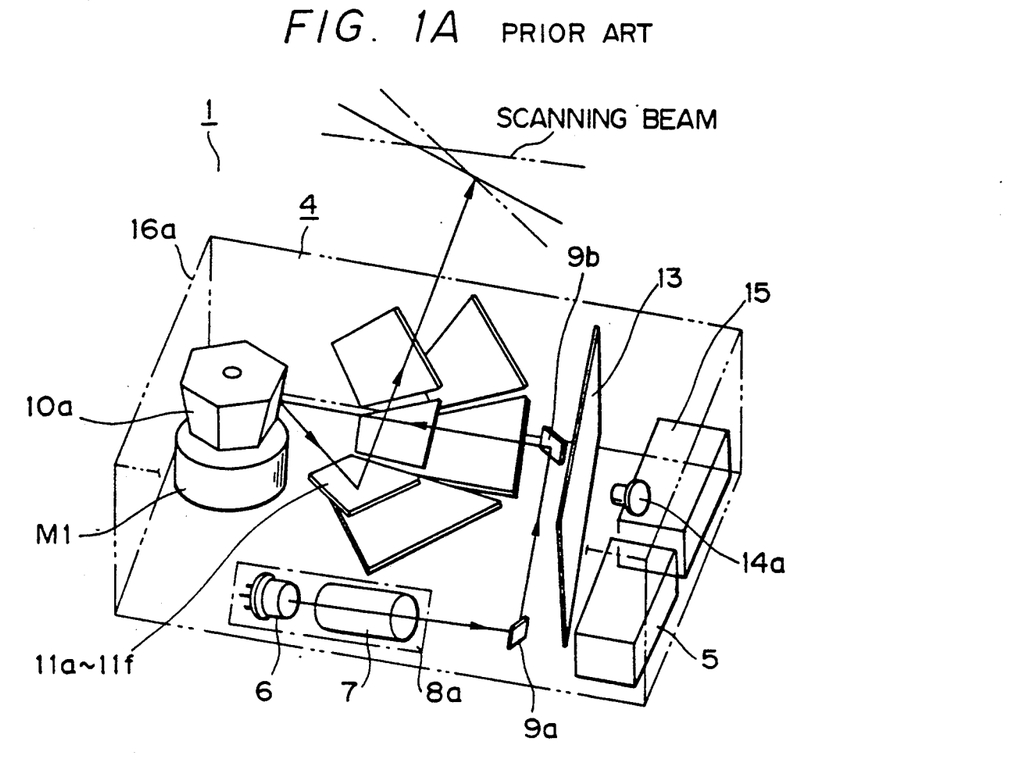
FIG. 1A is a perspective view and FIG. 1B is a side view of a conventional stationary bar code reader.
Figure 1B:
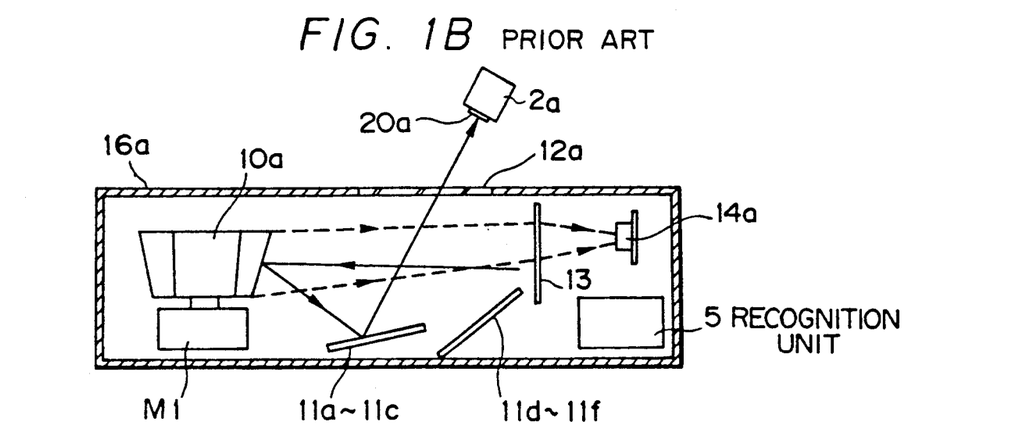

FIG. 1A is a perspective view illustrating the interior of a conventional stationary-type bar code reader and FIG. 1B is its side view. As shown, the stationary reader includes an optical unit 4 and a recognition unit 5. The optical unit 4 has the following functions: a bar code scanning function in which outgoing light from a light-beam-producing unit 8a, comprised of a light source 6 formed of, for example, a laser diode and a beam shaping lens 7, is reflected by plane mirrors 9a and 9b to a rotating polygonal mirror 10a and the reflected light from the polygonal mirror 10a is then reflected by scanning-pattern-forming mirrors 11a to 11f to produce light beams which scan a bar code 20a of a product 2a at different angles through a reading window 12a; and a photoelectric conversion function of gathering reflected light from the bar code 20a on the product 2a through the polygonal mirror 10a and the condenser lens 13 and receiving it with an optical sensor 14a for conversion to an electrical signal.

By way of example, the polygonal mirror 10a has six reflecting surfaces and makes six scans per rotation. The reflecting surfaces of the mirror are formed vertically at different angles to produce scanning beams in different directions. The polygonal mirror 10a is rotated by a motor M1. The motor M1, the light source 6 and the optical sensor 14a are driven by a control unit 15.

The recognition unit 5 recognizes an electrical signal from the optical sensor 14a as a bar code signal through an analog to digital converter (not shown) and a demodulator (not shown). The optical unit 4 and the recognition unit 5 are housed in a casing 16a.

Figure 2:
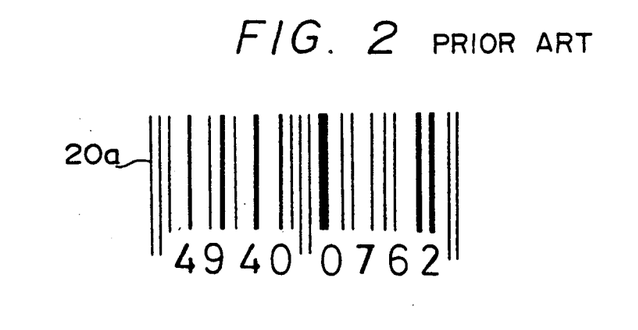
FIG. 2 illustrates a typical bar code.

The bar code 20a is formed of alternate black and white printed stripes of different widths, as shown in FIG. 2, and a character, a digit, a symbol or the like is represented by the permutation of a predetermined number of stripes.

When the product 2a is moved over the reading window 12a with the bar code 20a set downward while the scanning beams emerge from the reading window 12a under the control of the control unit 15 as shown in FIGS. 1A, and 1B, the bar code is scanned by the beams and recognized as data by the recognition unit 5 after conversion of the reflected light therefrom to an electrical signal by the optical sensor 14a.

There is another type of stationary-type bar code reader in which the recognition unit is housed in a separate casing.

The stationary-type bar code reader is used where a product 2a is so small that an operator can move it over the reading window 12a with one hand and the reader can read the bar code correctly irrespective of its orientation. That is, the scanning-pattern-forming mirrors 11a to 11f enable the bar code 20a of the product 2a to be read irrespective of its orientation.

Figure 3:
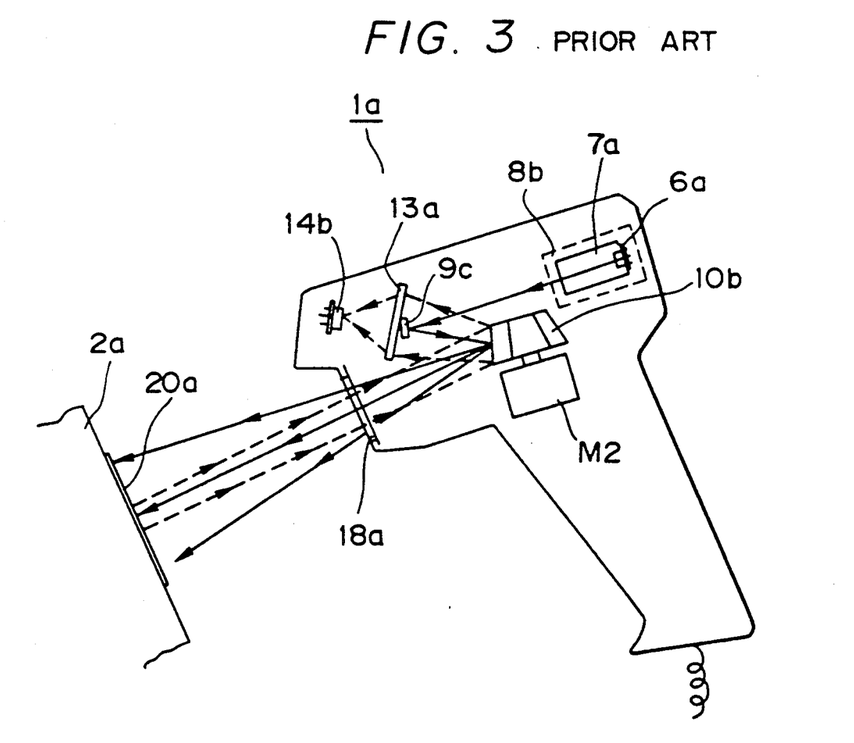
FIG. 3 is a side view of a conventional gun-type bar code reader.

FIG. 3 is a side view of a gun-type bar code reader. As shown, the gun-type bar code reader comprises a light-producing unit 8b consisting of a light source 6a of a laser diode and a beam-shaping lens 7a, a plane mirror 9c, a polygonal mirror 10b driven by a motor M2, a scanning window 18a, a condenser lens 13a and an optical sensor 14b.

As indicated by the solid arrows and the broken arrows, outgoing light from the light outputting unit 8b is reflected by the plane mirror 9c toward the polygonal mirror 10b and then radiated from the scanning window 18a to the outside as scanning beams. By putting the scanning window close to the bar code 20a printed on a product 2a, the bar code is scanned by the scanning beams. The reflected light from the bar code is gathered by the condenser lens 13a via the polygonal mirror 10b and then received by the optical sensor 14b for conversion to an electrical signal which is in turn applied to the external recognition unit (not shown).

The gun type reader 1a is used when the stationary reader 1 is difficult to use, e.g., where a product 2a is large or heavy or where there are a number of products even if they are small. With the gun type reader, however, since the scanning beams are oriented in one direction, the bar code 20a must be read in this direction.

Problems with the conventional bar code readers are summarized as follows. The stationary type reader in which an operator needs to move a product over the scanning window is difficult to operate with large or heavy products is and reduce the operator's efficiency. In such a case, the operator has to enter product information through the keyboard of an electronic cash register, or uses an additionally equipped hand reader such as the gun type reader recited above. Having a stationary-type reader as well as hand-held reader is uneconomical.

SUMMARY OF THE INVENTION

One object of the present invention is to provide a bar code reader which has high operability.

Another object of the present invention is to provide a separate-type bar code reader which is adapted for use as a stationary-type bar code reader when a product is small and light and as a hand-held bar code reader when a product is large or heavy.

A further object of the present invention is to provide an economical bar code reader which eliminates the need for both a stationary-type reader and a hand-held reader.

Figure 4:
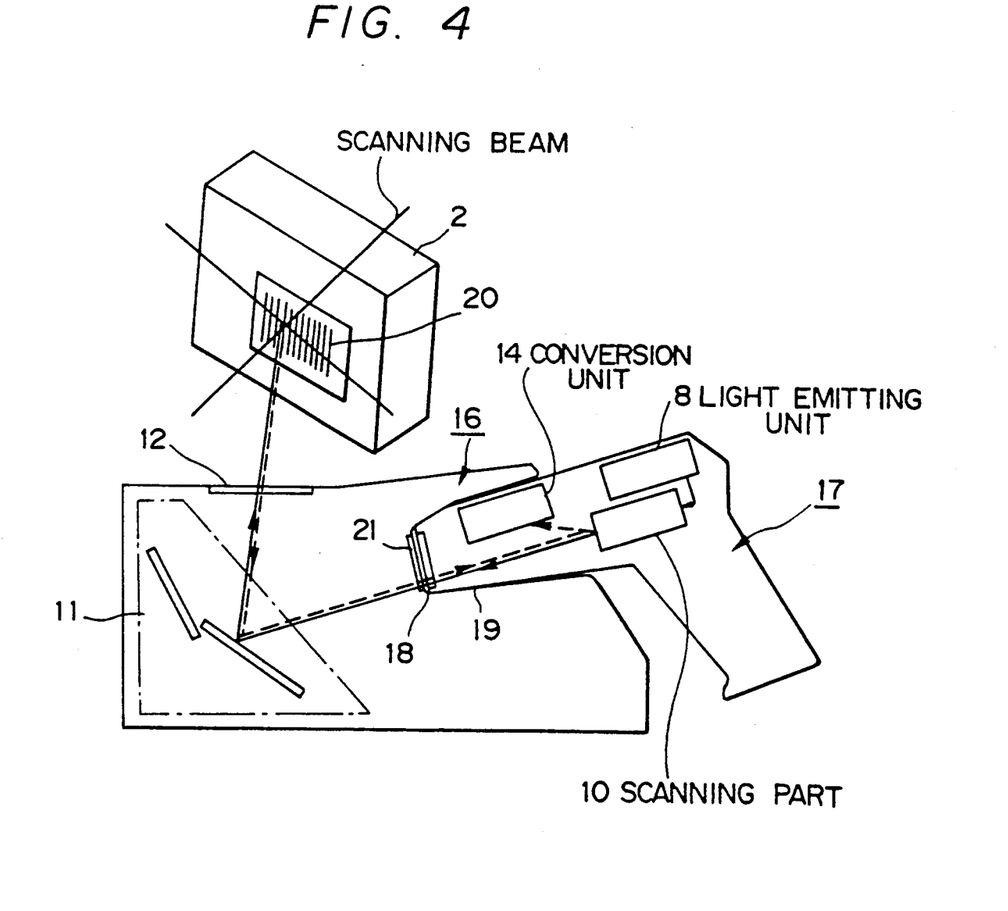
FIG. 4 illustrates the basic arrangement of a bar code reader of the present invention.

FIG. 4 illustrates the basic arrangement of the separate-type bar code reader of the present invention.

The separate-type bar code reader of the present invention comprises a main body 16 and a separable sub-body 17 which is detachably mounted on the main body 16.

The sub-body 17 comprises a light-emitting unit 8 for emitting light, a scanning unit 10 for reflecting the outgoing light from the light-emitting unit 8 to produce a scanning beam, a scanning window 18 for emitting the scanning beam from the scanning unit 10 to the outside, and a conversion unit 14 for receiving light reflected from a bar code 20 printed on an object 2 resulting from a scanning with the scanning beam, and converting the received light to an electrical signal.

The main body 16 comprises a mounting portion 19 on which the sub-body is detachably mounted, a light-receiving window 21 for receiving the scanning beam emitted through the scanning window 18 of the sub-body 17 mounted on the mounting portion 19, a scanning-pattern-forming mirror unit 11 for forming a scanning beam of a plurality of patterns from the scanning beam received through the light-receiving window 21, and a reading window 12 for transmitting the plural-pattern scanning beams formed by the scanning-pattern-forming mirror unit 11 to the outside.

When the sub-body 17 is mounted on the mounting portion 19 of the main body 16, the scanning beams of different patterns formed by the scanning-pattern-forming mirror unit 11 are directed onto the bar code 20 through the reading window 12, and the reflected light from the bar code is received by the conversion unit 14 through the reading window 12, the light-receiving window 21, the scanning window 18, etc. When the sub-body 17 is separated from the mounting portion 19 of the main body 16, the scanning beam generated by the scanning unit 10 is directed onto the bar code 20 and the light reflected therefrom is received by the conversion unit 14 through the scanning window 18, etc.

The scanning beams are of different patterns and are patterned so that they intersect one another. It is desired that one or more scanning beams should cross the bar code 20 irrespective of its orientation. If this occurs, non-directional reading of bar codes is realized.

The scanning unit 10 can be realized by rotating a polygonal mirror with reflecting surfaces formed at different angles.

The scanning-pattern-forming mirror unit 11 can be realized by disposing a plurality of mirrors in different positions at different inclinations. Thus, a scanning beam of a different pattern is produced each time the scanning beam from the scanning unit 10 crosses a mirror.

Scanning beams of different patterns may be formed by the scanning unit 10 of the sub-body 17 in place of the scanning-pattern-forming mirror unit 11 of the main body 16. In such a case, the main body 16 naturally has no need of the scanning-pattern-forming mirror 11 and has only to be provided with a single mirror for directing scanning beams of different patterns received through the light-receiving window 21 to the reading window 12.

In operation, when the sub-body 17 is mounted on the main body 16, a scanning beam is transmitted from the sub-body 17 to the main body 16 through the scanning window 18 and light-receiving window 21 so that scanning beams of different patterns are formed by the scanning-pattern-forming mirror unit 11 and then directed onto the bar code 20 printed on the external object 2 through the reading window 12. The light reflected from the bar code is converted by the conversion unit 14 to an electrical signal so that data represented by the bar code is read.

When the sub-body 17 is removed from the mounting portion 19 of the main body 16, the scanning window 18 of the sub-body 17 is brought near the bar code 20 printed on the object 2 so that the bar code is irradiated by the scanning beam through the scanning window 18 and the light reflected therefrom is converted to an electrical signal to be thereby read as bar code data 20.

In the case of an object 2 which is small or light enough for an operator to move it with one hand with its bar code 20 directed toward the reading window 12, the sub-body 17 may be mounted on the main body 16 for use as a stationary-type reader. When an object 2 is large or heavy, however, the sub-body 17 can be removed from the mounting portion 19 of the main body 16 for use as a hand-held reader. Therefore, there is no necessity for a stationary reader and a hand reader to be equipped separately. The separate-type bar code reader of the present invention is thus economical.

DETAILED DESCRIPTION OF THE PREFERRED EMBODIMENT

Figure 5:
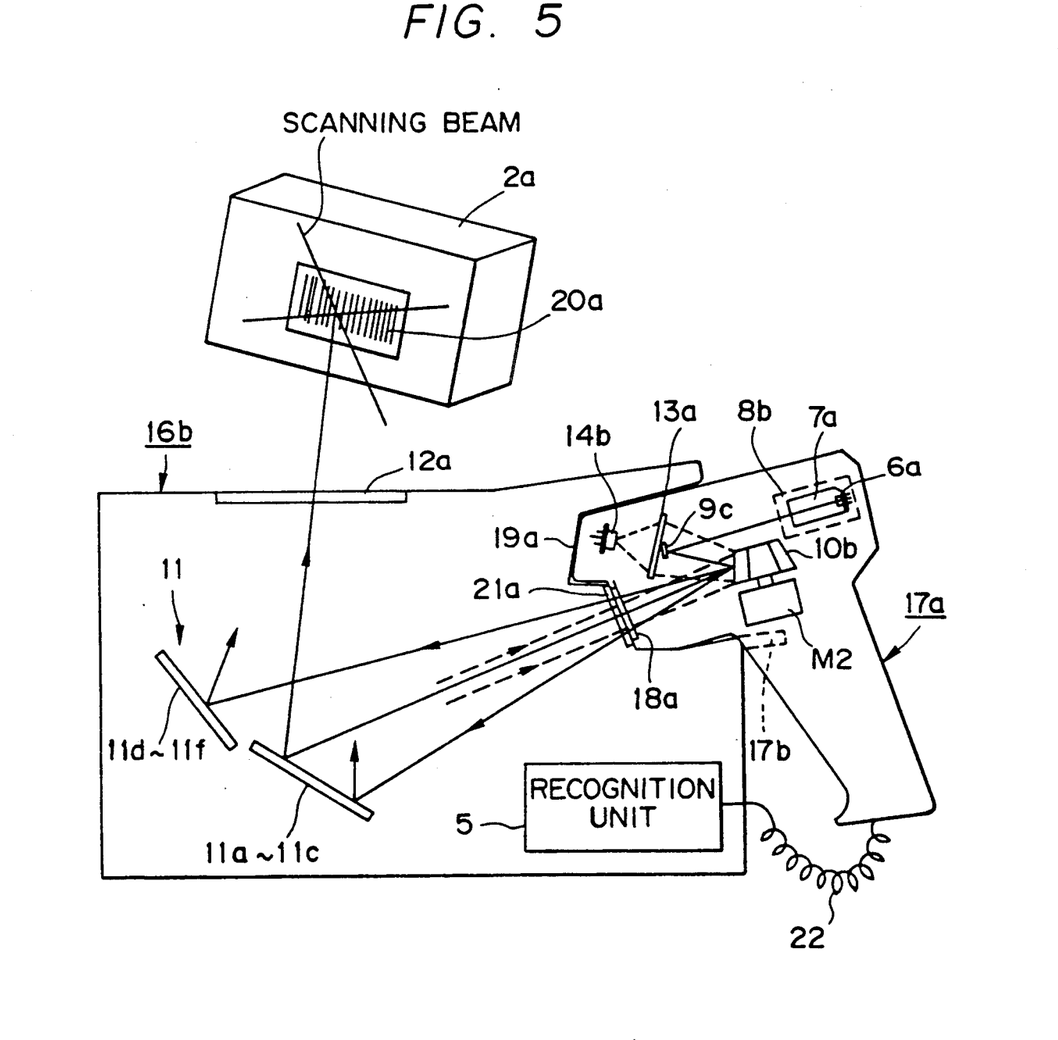
FIG. 5 is a side view of a bar code reader according to an embodiment of the present invention.
Figure 6:
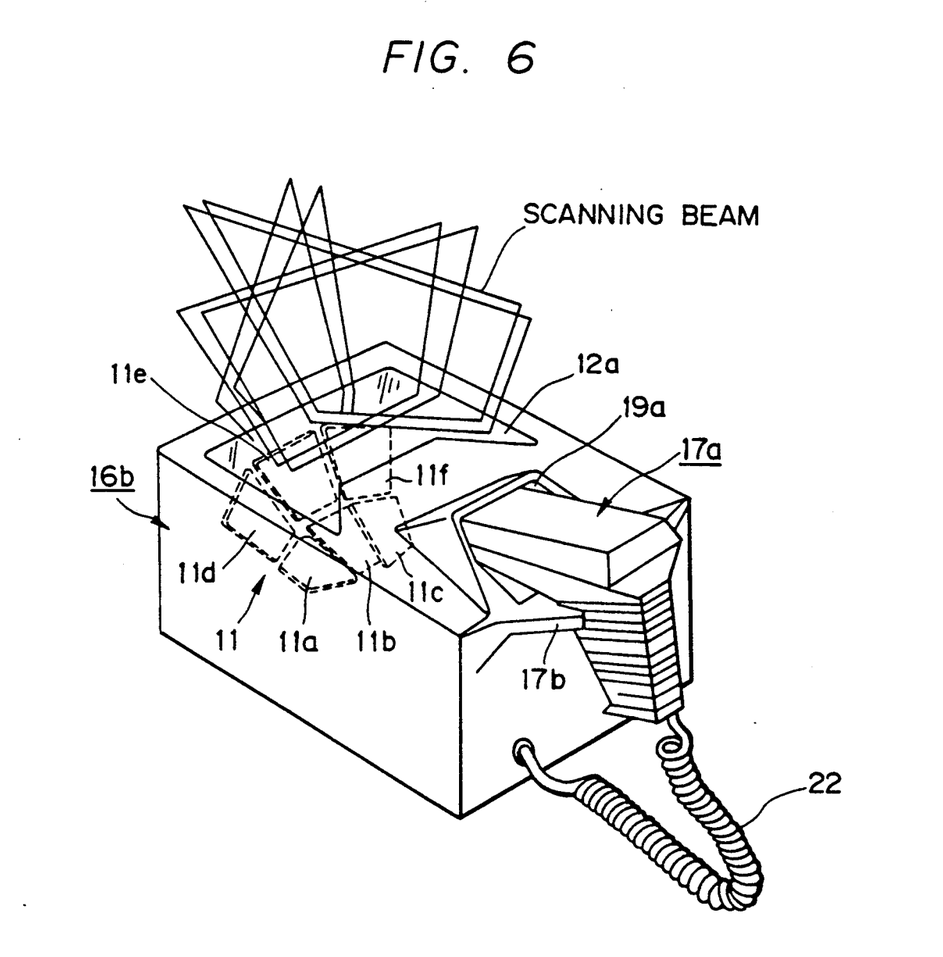
FIG. 6 is a perspective view of the bar code reader of FIG. 5.

FIG. 5 is a side view and FIG. 6 is a perspective view of a bar code reader embodying the present invention. The same reference numbers represent the same elements in all the drawings. In FIG. 5, a product 2a, a polygonal mirror 10b, an optical sensor 14b and a stationary unit 16b correspond to the object 2, the scanning unit 10, the conversion unit 14 and the main body 16 of FIG. 4, respectively.

As illustrated in FIGS. 5 and 6, the bar code reader of this embodiment is comprised of a stationary unit 16b and a separable unit 17a. The separable unit 17a is detachably mounted on the stationary unit 16b through a mounting portion 19a.

As with the conventional gun-type reader described in conjunction with FIG. 3, the separable unit 17a comprises a light-outputting unit 8b constructed from a light source 6a of a laser diode and a beam-shaping lens 7a, a mirror 9c, a polygonal mirror 10b rotated by a motor M2, a scanning window 18a, a condenser lens 13a and an optical sensor 14b.

The stationary unit 16b is provided with the mounting portion 19a on which the head of the separable unit 17a is detachably mounted. The mounting portion 19a is provided with two protruding guides 17b. The separable unit 17a fits between the guides 17b. In the back of the mounting portion 19a is provided a light-receiving window 21a for directing a scanning beam emitted from the inside of the separable unit 17a through the scanning window 18a to the inside of the stationary unit 16b when the separable unit 17a is mounted on the mounting portion 19a. The light-receiving window 21a and the scanning window 18a are covered with a transparent member, such as a glass sheet, thereby preventing dust or dirt from entering the stationary unit 16b and the separable unit 17a.

Figure 7:
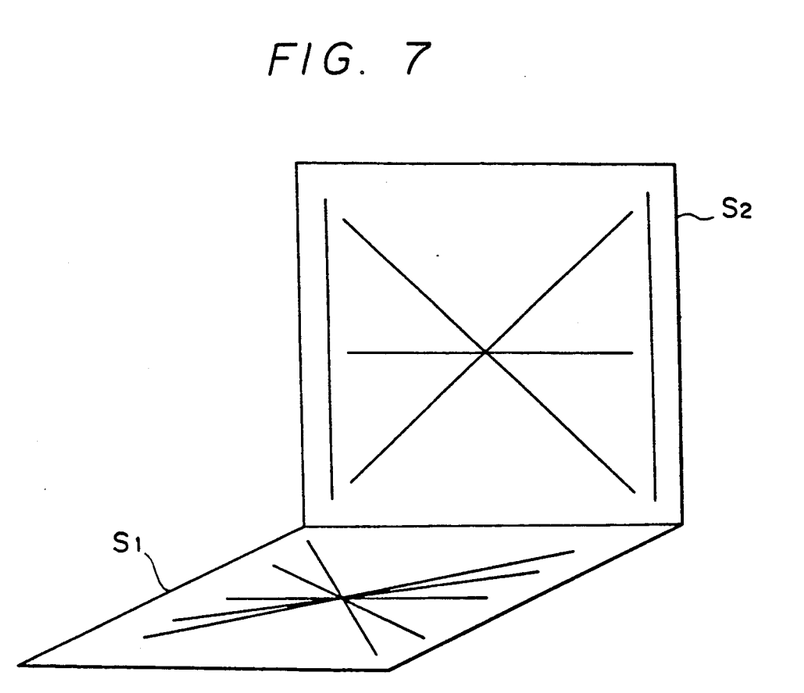
FIG. 7 illustrates patterns of scanning beams formed by the scanning-pattern-forming mirrors of FIGS. 5 and 6.

On the upper surface of the stationary unit 16b is provided a reading window 12a covered with a transparent member, such as a glass sheet, which can transmit a scanning beam. In the stationary unit 16b is installed a scanning-pattern-forming mirror unit 11 which forms scanning beams of different patterns from an incident scanning beam transmitted through the light-receiving window 21a. The resulting scanning outside through the reading window 12a. The scanning-pattern-forming mirror unit 11 is comprised of a plurality of mirrors 11a through 11f (six in the figure), disposed in their respective locations at different inclinations. When an incident scanning beam crosses the mirrors in sequence, new scanning beams of different patterns are formed. The resulting scanning beams should have patterns which intersect with one another on the surface of the reading window 12a and one or more scanning beams may be able to scan the bar code 2a when it is placed at any direction over the reading window 12a. An example of such patterns of the scanning beams is illustrated in FIG. 7. This Figure indicates linear patterns formed by the scanning beams when they cross the surface S1 of the reading window 12a and a virtual plane S2 normal to the surface S1.

The stationary unit 16b incorporates a recognition unit 5 which recognizes an electrical signal output from the optical sensor 14b of the separable unit 17a as bar code data. The electrical signal is fed to the recognition unit 5 via a cable 22 connected between the separable unit 17a and the stationary unit 16b.

With the construction described above, the separable unit 17a can be mounted on the stationary unit 16b for use as a stationary-type bar code reader for a product 2a which is small or light enough to allow an operator to move it with one hand, with the bar code 20a directed toward the reading window 12a. In this case, light from the light-outputting unit 8b of the separable unit 17a is reflected by the mirror 9c and the polygonal mirror 10b to form a scanning beam. The scanning beam is transmitted into the stationary unit 16b through the scanning window 18a and the light-receiving window 21a. It is then reflected by the scanning-pattern-forming mirror unit 11 to form scanning beams of different patterns, which are then transmitted to the outside through the reading window 12a to thereby scan the bar code 20a of the product 2a. Part of the light reflected from the bar code follows the reverse path of the scanning beam, that is, it falls onto the polygonal mirror 10b through the reading window 12a, the scanning-pattern-forming mirror unit 11, the light-receiving window 21a and the scanning window 18a, and the light reflected from the polygonal mirror 10b is received by the optical sensor 14b through the condenser lens 13a and is then converted to an electrical signal. The electrical signal is fed to the recognition unit 5 via the cable 22 to be read as bar code data.

When the product 2a is so large or heavy that the use of the stationary type reader is difficult, the separable unit 17a is removed from the mounting portion 19 for use as a hand type reader. In this case, as described in conjunction with FIG. 3, the scanning window 18a of the separable unit 17a is held near the bar code 20a printed on the product 2a so that the bar code is scanned by the scanning beam from the scanning window 18a. Part of the light reflected from the bar code is received by the optical sensor 14b through the scanning window 18a, the polygonal mirror 10b and the condenser lens 13a for conversion to an electrical signal. As described above, the electrical signal is fed to the recognition unit 5 to be read as bar code data.

Thus, the reader of the present invention can be used properly as a stationary-type or a hand-held reader according to the size or weight of a product. This is very economical because two different types of readers need not be equipped separately.

In the present invention, the forms of the main body 16 (stationary unit 16b) and the separable unit 17 (17b) are not limited to those of the embodiment described. Various forms may be adopted. In particular, the separable unit 17 (17b) need not be of the gun type. Any form can be adopted providing it is easy for an operator to hold and operate. The structure of the mounting portion 19 (19a) may also be modified variously, providing the separable unit 17 (17b) can be securely mounted on the main body 16 (stationary unit 16b).

As described above, according to the present invention, by detachably mounting the separable unit 17 incorporating the light-outputting unit 8, the scanning unit 10 and the conversion unit 14 on the main body 16 incorporating the scanning-pattern-forming mirror unit 11, the separable unit 17 may be mounted on the main body 16 for use as a stationary type reader where a product is of a size or weight which allows an operator to perform a read operation on its bar code using one hand. Where the scanning unit 10 also performs the same function as the scanning-pattern-forming mirror unit 11, the scanning-pattern-forming mirror unit 11 is not provided in the main body 16. Where a body is too large or heavy for the stationary-type reader to be conveniently used, the separable unit 17 is removed from the main body 16 for use as a hand-held reader. This will improve the work efficiency of the operator. In addition, it is economical because a stationary-type bar code reader and a hand-held bar code reader need not be equipped separately.

What is claimed is:

1. A bar code reader for reading a bar code on an object, comprising:
    light-emitting means for emitting an outgoing ray of light;
    scanning means for reflecting the outgoing ray of light from said light-emitting means to form a scanning beam;
    a scanning-pattern-forming mirror unit responsive to the scanning beam from said scanning means for forming a plurality of scanning beams of different patterns;

conversion means for receiving reflected light resulting from scanning a bar code printed on the object with the scanning beam and the scanning beams of the different patterns and for converting the received reflected light to an electrical signal;

a separable unit, including:
said light-emitting means,
said scanning means,
said conversion means, and
a scanning window for directing the scanning beam formed by said scanning means outside of said separable unit; and a main-body unit, including:
a mounting portion on which said separable unit is detachably mounted,
a light-receiving window for receiving the scanning beam emitted through said scanning window of said separable unit when said separable unit is mounted on said mounting portion,
said scanning-pattern-forming mirror unit disposed in position to form the scanning beams of the different patterns from the scanning beam received through said light-receiving window, and
a reading window for transmitting the scanning beams of the different patterns formed by said scanning-pattern-forming mirror unit outside of said main-body unit, the bar code on the object being scanned by the scanning beams of the different patterns emitted from said reading window when said separable unit is mounted on said mounting portion of said main-body unit and the bar code being scanned by the scanning beam emitted from said scanning window when said separable unit is separated from said mounting portion of said main-body unit.

2. A bar code reader according to claim 1, wherein said scanning-pattern-forming mirror unit comprises a plurality of mirrors disposed in respective places at different inclination, and each of the scanning beams of the different patterns is formed when the scanning beam for said scanning means crosses one of the mirrors.

3. A bar code reader according to claim 1, wherein said main-body unit further comprises:
recognition means operatively connected to said separable unit for recognizing the electrical signal output from said conversion means as bar code data.

4. A bar code reader according to claim 1, wherein said scanning-pattern-forming mirror unit forms said plurality of scanning beams of different patterns such that one of said plurality of scanning beams of different patterns intersect one another and at least one of said plurality of scanning beams of different patterns cross the bar code.

5. A bar code reader according to claim 1, wherein said light-emitting means comprises:
a light source of a semiconductor laser which emits the outgoing ray of light and
a beam-shaping lens for shaping the outgoing ray of light.

6. A bar code reader according to claim 1, wherein said scanning means comprises:
a polygonal mirror having a plurality of reflective surfaces formed at different angles and
a motor for rotating said polygonal mirror.

7. A bar code reader according to claim 1, wherein said scanning window and said light-receiving window are both covered with a transparent member which can transmit the scanning beam.

8. A bar code reader according to claim 1, wherein said conversion means comprises:
a condenser lens for gathering the reflected light from the bar code received through said scanning window and
an optical sensor for receiving the reflected light gathered by said condenser lens.

9. A bar code reader according to claim 1, wherein said scanning window and said light-receiving window are opposed to each other when said separable unit is mounted on said mounting portion of said main-body unit.

10. A bar code reader according to claim 3, wherein said recognition means is connected to said separable unit by an electrical cable transmitting the electrical signal output from said conversion means to said recognition means.

11. A bar code reader for reading a bar code on an object comprising:
a main-body unit and a separable unit which is detachably mounted on said main-body unit,
said separable unit including:
light-emitting means for emitting an outgoing ray of light;
scanning means for reflecting the outgoing ray of light emitted from said light-emitting means to form a scanning beam;
a scanning window for directing the scanning beam formed by said scanning means outside of said separable unit; and
conversion means for receiving reflected light resulting from scanning of a bar code on the object with the scanning beam and for converting the reflected light to an electrical signal; and
said main-body unit including:
a mounting portion for detachably mounting said separable unit;
a light-receiving window for receiving the scanning beam emitted through said scanning window of said separable unit when said separable unit is mounted on said mounting portion;
a scanning-pattern-forming mirror unit for forming a plurality of scanning beams of different patterns from the scanning beam received through said light-receiving window, reflected light resulting from scanning of a bar code on the object with the scanning beams being received and converted to an electrical signal by the conversion means; and
a reading window for emitting the scanning beams of a plurality of patterns formed by said scanning-pattern-forming mirror unit outside of said main-body unit, the bar code being scanned by the scanning beams of the patterns formed by said scanning-pattern-forming mirror unit and emitted to the bar code through said reading window and the reflected light from the bar code being received by said conversion means at least through said reading window, said light-receiving window and said scanning window when said separable unit is mounted on said mounting portion of said main-body unit, the bar code being scanned by the scanning beam emitted by said scanning means through said scanning window and the reflected light from the bar code being received by said conversion means through said scanning window when said separable unit is separated from said mounting portion of said main-body unit.

* * * * *